(12) United States Patent
Honmura et al.

(10) Patent No.: US 7,039,114 B2
(45) Date of Patent: May 2, 2006

(54) DATA SEPARATION AND DECODING DEVICE (75) Inventors: Hiroshi Honmura, Tokyo (JP); Atsushi Miyamoto, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 735 days.

(21) Appl. No.: 10/209,273

(22) Filed: Aug. 1, 2002

(65) Prior Publication Data
US 2003/0035485 A1 Feb. 20, 2003

(30) Foreign Application Priority Data
Aug. 8, 2001 (JP) ............... 2001-241384

(51) Int. Cl.
*H04N 7/12* (2006.01)
(52) U.S. Cl. ............... 375/240.25; 375/240.28
(58) Field of Classification Search ........... 375/240.25, 375/240.28, 240.1, 240.26, 385.1; 348/423.1, 348/412; 370/442, 464, 487, 516, 517, 538, 370/38, 474; 725/48, 59, 135
See application file for complete search history.

(56) References Cited

U.S. PATENT DOCUMENTS

| | | | |
|---|---|---|---|
| 5,828,414 A * | 10/1998 | Perkins et al. ......... | 375/240.01 |
| 5,832,256 A | 11/1998 | Kim | |
| 5,959,659 A * | 9/1999 | Dokic ......... | 725/152 |
| 5,966,387 A | 10/1999 | Cloutier | |
| 2002/0064189 A1* | 5/2002 | Coupe et al. ....... | 370/537 |
| 2003/0043924 A1* | 3/2003 | Haddad et al. ....... | 375/240.28 |
| 2004/0078828 A1* | 4/2004 | Parchman et al. ....... | 725/135 |
| 2004/0196906 A1* | 10/2004 | Gordon et al. ....... | 375/240.12 |
| 2004/0210931 A1* | 10/2004 | Gordon et al. ....... | 725/39 |

FOREIGN PATENT DOCUMENTS

| | | |
|---|---|---|
| EP | 0 624 982 A2 | 5/1994 |
| EP | 0 703 713 A2 | 9/1995 |

* cited by examiner

*Primary Examiner*—Vu Le
(74) *Attorney, Agent, or Firm*—McGinn IP Law Group, PLLC (57) ABSTRACT

A clock recovery circuit is provided with an STC counter, an adder for setting the initial value of the STC counter by adding the value of a PCR and the multiplexing delay time; a subtracter for subtracting the multiplexing delay time from the output of the STC counter; a latched STC register for latching the subtraction result of the subtracter; a PCR register for latching the value of the PCR; and a PWM for controlling the frequency of an external clock oscillation source that supplies a clock signal to the STC counter. The clock oscillation source is provided with an LPF and a VCO, wherein a clock signal outputted from the VCO is supplied to the STC counter and a timer within a stream multiplexing circuit. The clock signal outputted from the clock oscillation source is a reference clock signal of an MPEG system. Thereby, the scale of the entire device can be reduced by reducing the number of separation and decoding circuits.

17 Claims, 7 Drawing Sheets

DATA SEPARATION AND DECODING DEVICE

BACKGROUND OF THE INVENTION

1. Technical Field of the Invention

The present invention relates to a data separation and decoding device suitable for a set top box (STB) utilized in recording digital broadcasts such as satellite broadcasts, in particular, to a data separation and decoding device for allowing multiplexing of a digital signal.

2. Description of the Related Art

Recently, an MPEG (Motion Picture Coding Experts Group) 2 standard has been adopted for compression of moving image data in broadcasting systems for multi-channel digital broadcasts, in DVDs, or the like. According to the MPEG2 standard, two types of streams, a transport stream (TS) and a program stream (PS), are specified as signals wherein a plurality of contents, such as video content, audio content, and the like, are multiplexed and, in particular, a transport stream is utilized in digital broadcasts. A transport stream is formed of sequential packets, which are referred to as TS packets. One TS packet is formed of a four byte packet header, provided at the front, as well as a 184 byte adaptation field and/or a payload provided following the packet header. That is to say, the number of bytes of a TS packet is 188 bytes. In addition, a packet header includes an eight bit synchronous byte, a 13 bit packet ID, and the like. Furthermore, the adaptation fields of some of the TS packets include a PCR (Program Clock Reference) that indicates information concerning the relative transmission time of these TS packets.

Figure 1:
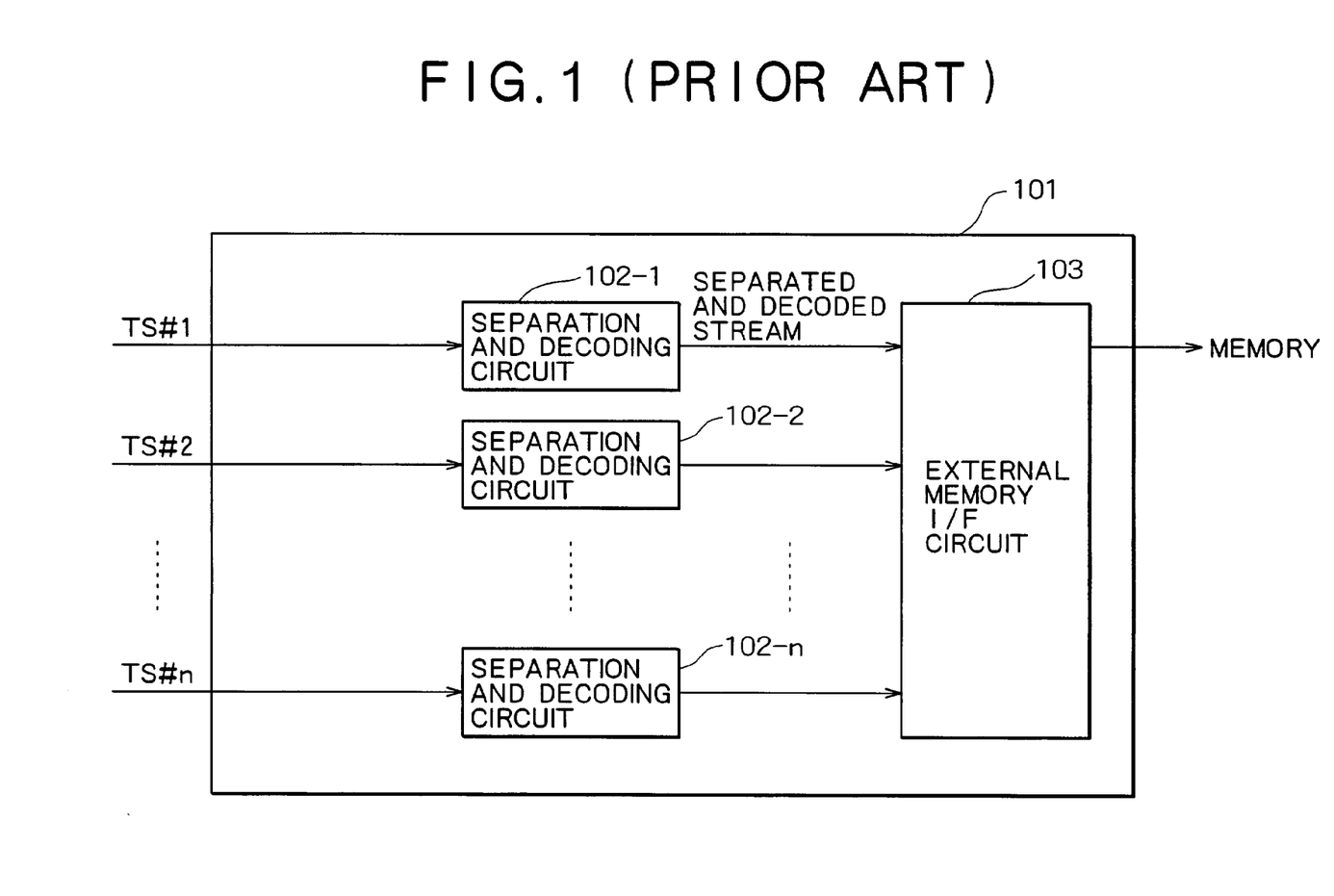
FIG. 1 is a block diagram showing a data separation and decoding device according to a prior art.

In addition, recently, transport streams of a plurality of channels have come to be simultaneously transmitted in digital broadcasts. FIG. 1 is a block diagram showing a conventional data separation and decoding device. Conventional data separation and decoding device 101 is provided with separation and decoding circuits 102-1 to 102-n (n : natural number) in the same number as the number of channels of the transport streams. Transport streams TS#1 to TS#n, respectively, are inputted to separation and decoding circuits 102-1 to 102-n. Then, separation (filtering) of TS packets and descrambling are carried out by each of the separation and decoding circuits based on the packet ID included in the packet header of the TS packet. An external memory interface (I/F) circuit 103 is provided at the rear stage of separation and decoding circuits 102-1 to 102-n so that the separated and decoded stream outputted from each of the separation and decoding circuits 102-1 to 102-n is inputted to this external memory I/F circuit 103. External memory I/F circuit 103 selects one separated and decoded stream based on a command from the outside so as to output it to a memory.

Data separation and decoding device 101 according to a prior art having the above described configuration makes it possible to store, in a memory, data of a program that has been arbitrarily selected for transport streams of a plurality of channels.

However, there are problems wherein the scale of the separation and decoding circuits is comparatively large and wherein such separation and decoding circuits are provided in the same number as the number of channels of the transport streams and, therefore, the scale of the entire device becomes large.

SUMMARY OF THE INVENTION

The object of the present invention is to provide a data separation and decoding device that allows a reduction in the number of separation and decoding circuits so that the scale of the entire device is reduced.

The first data separation and decoding device according to the present invention is a data separation and decoding device for extracting desired data from a plurality of transport streams formed of a plurality of sequential packets, some of which include transmission time information, characterized by comprising: a stream multiplication circuit for multiplexing the above described plurality of transport streams and for outputting a multiplexing delay time signal indicating delay time of each packet that has occurred at the time of the above described multiplexing; a separation and decoding circuit for arbitrarily selecting data from the stream multiplexed by the above described stream multiplexing circuit and for preparing a separated and decoded stream by decrypting the data in a case where the data has been encrypted or by forming the separated and decoded stream of a packet in the original form in a case where the data has not been encrypted as well as for outputting the above described multiplexing delay time signal and the above described transmission time information included in the above described multiplexed stream; and a clock recovery circuit for allowing a clock oscillation source to adjust the frequency of the clock signal whenever the above described transmission time information is inputted so that the frequency is associated with the transmission time information and the delay time of the packet.

The second data separation and decoding device according to the present invention is a data separation and decoding device for extracting desired data from a plurality of transport streams formed of a plurality of sequential packets, some of which include transmission time information, characterized by comprising: a stream multiplexing circuit for multiplexing the above described plurality of transport streams and for outputting a reception time signal indicating the reception time of each packet; a separation and decoding circuit for arbitrarily selecting data from the stream multiplexed by the above described stream multiplexing circuit and for preparing a separated and decoded stream by decrypting the data in a case where the data has been encrypted or by forming the separated and decoded stream of a packet in the original form in a case where the data has not been encrypted as well as for outputting the above described reception time signal; and an output interface circuit for outputting a packet forming the above described separated and decoded stream that matches the reception time indicated by the above described reception time signal.

The third data separation and decoding device according to the present invention is a data separation and decoding device for extracting desired data from a plurality of transport streams formed of a plurality of sequential packets, some of which include transmission time information, characterized by comprising: a stream multiplexing circuit for multiplexing the above described plurality of transport streams and for outputting a multiplexing delay time signal indicating delay time of each packet that has occurred at the time of the above described multiplexing and a reception time signal indicating the reception time of each packet; a separation and decoding circuit for arbitrarily selecting data from the stream multiplexed by the above described stream multiplexing circuit and for preparing a separated and decoded stream by decrypting the data in a case where the data has been encrypted or by forming the separated and decoded stream of a packet in the original form in a case where the data has not been encrypted as well as for outputting the above described multiplexing delay time signal, the above described reception time signal and the above described transmission time information included in the above described multiplexed stream; a clock recovery circuit for allowing a clock oscillation source to adjust the frequency of the clock signal whenever the above described transmission time information is inputted so that the frequency is associated with the transmission time information and the delay time of the packet; and an output interface circuit for outputting a packet forming the above described separated and decoded stream that matches the reception time indicated by the above described reception time signal.

According to the present invention, a process is carried out by the separation and decoding circuits after a plurality of transport streams has been multiplexed and, therefore, the number of separation and decoding circuits may be fewer than the number of transport streams. In addition, the clock recovery circuit adjusts the frequency of the clock signal that is associated with the multiplexing delay time of a packet and, therefore, the difference in the delay time for each packet has no effect. Furthermore, by providing an output interface circuit it is possible to make the time information in a stream outputted to another device agree with that of the oscillation side, such as of a broadcast station.

Here, the above described stream multiplexing circuit has a first in/first out memory provided for each of the above described transport streams, wherein the above described delay time can be the period of time from the time when the final byte of each packet is inputted to the above described first in/first out memory to the time when the front byte of the packet is outputted.

In addition, the above described clock recovery circuit can have a first register for latching the above described transmission time information; a counter; an adder for setting the value gained by adding the above described delay time to the transmission time indicated by the above described transmission time information as the initial value of the above described counter; a subtracter for subtracting the above described delay time of each packet from the output value of the above described counter; and a second register for latching the output value of the above described subtracter, wherein adjustment of the above described clock oscillation source may be carried out in accordance with the difference between the output values of the above described first and second registers.

Moreover, the above described output interface circuit can output each packet associated with the difference between the two reception times of the sequential packets included in the above described separated and decoded stream.

Furthermore, the above described clock recovery circuit can have a control unit, such as a pulse width modulator, for controlling the operation of the above described clock oscillation source so that the difference between the output values of the above described first and second registers is nullified.

THE PREFERRED EMBODIMENTS OF THE INVENTION

Figure 6:
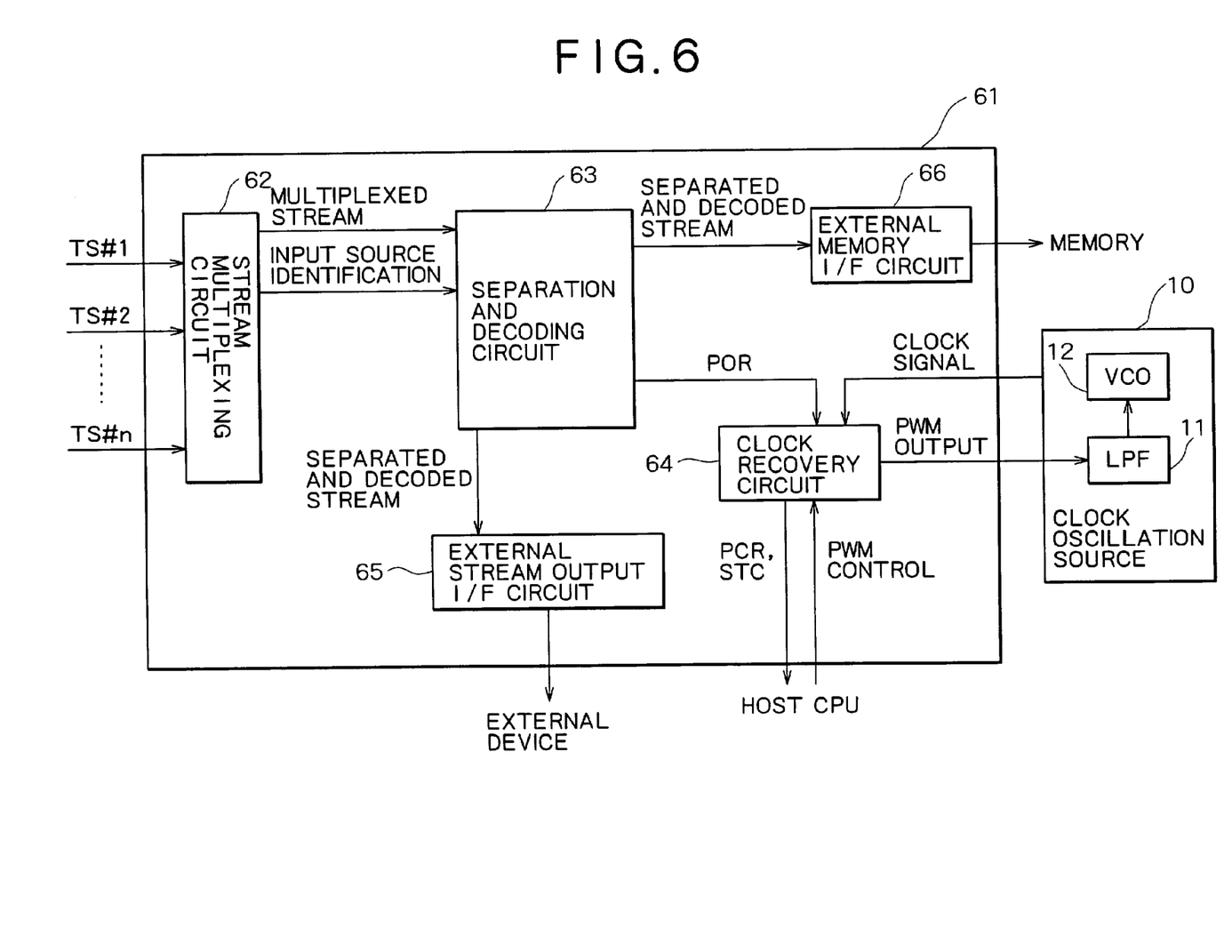
FIG. 6 is a block diagram showing a data separation and decoding device for multiplexing transport streams.
Figure 7:
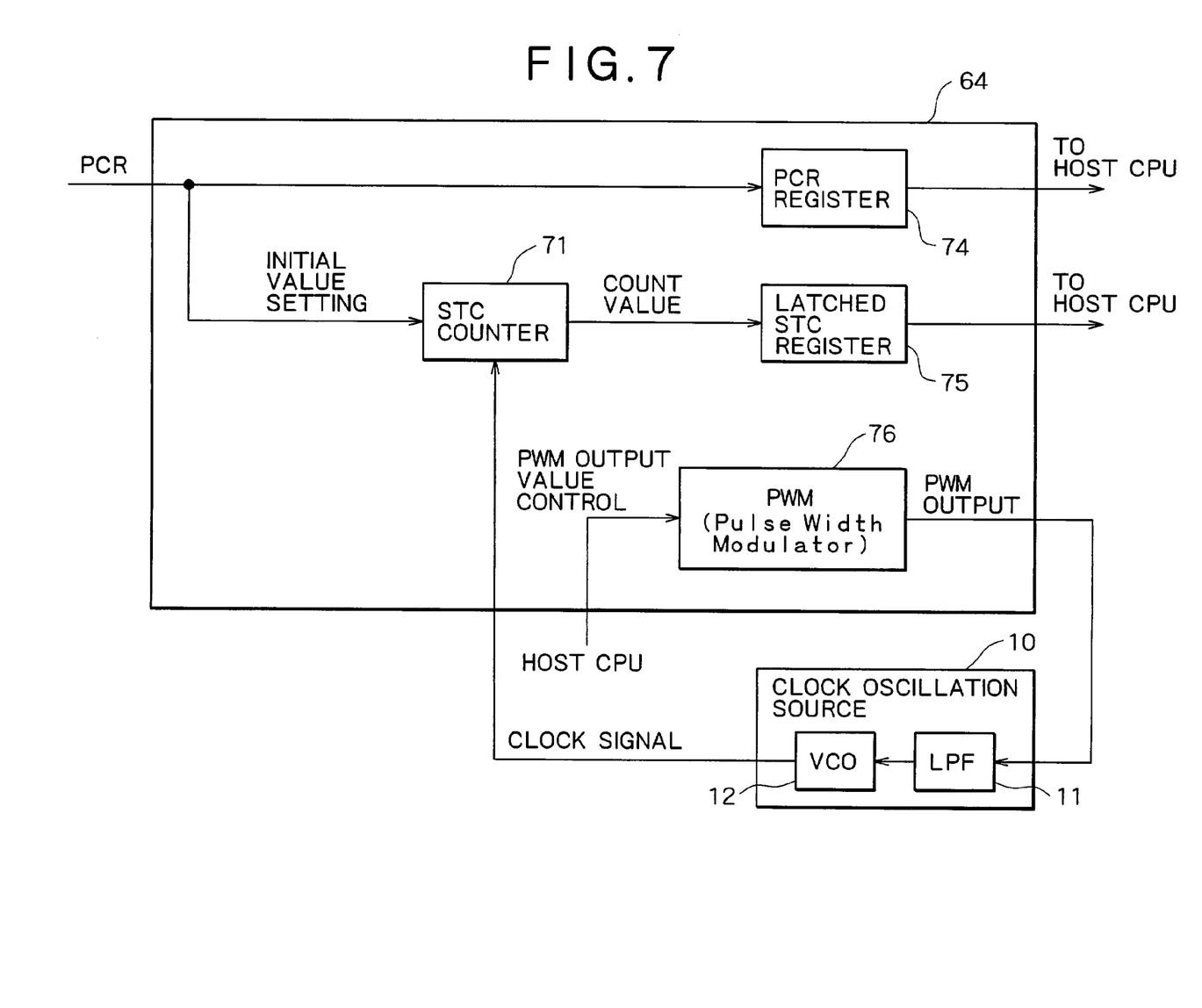
FIG. 7 is a block diagram showing a clock recovery circuit 64 provided in a reference example.

The present inventors have formed the idea of allowing one separation and decoding circuit to share transport streams of a plurality of channels by time division multiplexing the transport streams in packet units at the front stage of the separation and decoding circuits in order to solve the above described problems. FIG. 6 is a block diagram showing a data separation and decoding device for multiplexing transport streams. Hereinafter, this data separation and decoding device is referred to as a reference example. In addition, FIG. 7 is a block diagram showing a clock recovery circuit 64 provided in the reference example.

A data separation and decoding device 61 of a reference example is provided with a stream multiplexing circuit 62 for multiplexing transport streams TS#1 to TS#n of n channels. A multiplexed stream and an input source identification signal for identifying a channel are outputted from stream multiplexing circuit 62. In addition, a separation and decoding circuit 63 for carrying out separation (filtering) of a predetermined TS packet from the multiplexed stream and descrambling of the predetermined TS packet based on the input source identification signal and the packet ID is provided in data separation and decoding device 61. Separation and decoding circuit 63 outputs a separated and decoded stream after the separation and descrambling of the TS packet as well as outputs PCRs included in some TS packets. Moreover, data separation and decoding device 61 is provided with an external stream output I/F circuit 65 and an external memory I/F circuit 66 to which a separated and decoded stream is inputted as well as a clock recovery circuit 64 to which a PCR is inputted. External stream output I/F circuit 65 is an I/F circuit for an external device such as, for example, another set top box (STB) while external memory I/F circuit 66 is an I/F circuit for a memory. Clock recovery circuit 64 is provided with, as shown in FIG. 7, an STC (System Time Clock) counter 71 to which a PCR is inputted, a PCR register 74 for latching the value of a PCR, a latched STC register 75 for latching the counter value of STC counter 71 and a pulse width modulator (PWM) 76 for controlling the frequency of an external clock oscillation source 10 that supplies a clock signal to STC counter 71. Clock oscillation source 10 is provided with a low pass filter (LPF) 11, to which the output of PWM 76 is inputted, and with a voltage controlled oscillator (VCO) 12 so that the clock signal outputted from VCO 12 is supplied to STC counter 71. The output value of PCR register 74 and the output value of the latched STC register 75 are compared by, for example, a host central processing unit (CPU) so that the operation of PWM 76 is controlled based on this comparison result. For example, in a case where the output value of PCR register 74 is delayed, the host CPU modifies the waveform of PWM 76 in order to lower the frequency of the clock signal from clock oscillation source 10. Here, the clock signal outputted from clock oscillation source 10 is utilized as a reference clock signal of the MPEG2 system and is supplied to a circuit other than STC counter 71 so that reproduction of images and of sound are carried out according to the MPEG2 system based on the clock signal.

In the reference example of such a configuration, transport streams of a plurality of channels are multiplexed and, therefore, one separation and decoding circuit 63 is sufficient. Accordingly, the circuit scale is reduced.

In this reference example, however, there is a drawback wherein an appropriate reproduction, or the like, cannot be carried out due to a delay that occurs at the time of multiplexing. That is to say, when a stream prepared by means of time division packet multiplexing and a stream that has actually been transmitted are compared, a delay that fluctuates according to each packet occurs in the stream that has been multiplexed. Therefore, mismatching occurs between the PCR in the stream that has actually been transmitted and the PCR in the stream that has been multiplexed. In a case where such a mismatch has occurred, it becomes impossible for clock recovery circuit 64 to carry out an adjustment of the frequency of the clock signal so that an appropriate reproduction, or the like, cannot be carried out. For example, even in a case where the frequency of the clock signal outputted from clock oscillation source 10 is appropriate, the frequency is judged to be too high or is judged to be too low and an unnecessary modification of the frequency is carried out.

In addition, a shift occurs between the time intervals of TS packets in the stream outputted from external stream I/F circuit 65 to an external device and the time intervals of TS packets in the stream transmitted to stream multiplexing circuit 62. Therefore, recovery of the clock signal cannot be achieved in the external device to which the stream is inputted.

Thus, the present inventors have developed, as a result of continuing intensive research, the concept of a data separation and decoding device that allows for an appropriate adjustment of the frequency of the clock signal while transport streams are time division multiplexed in packet units.

Figure 2:
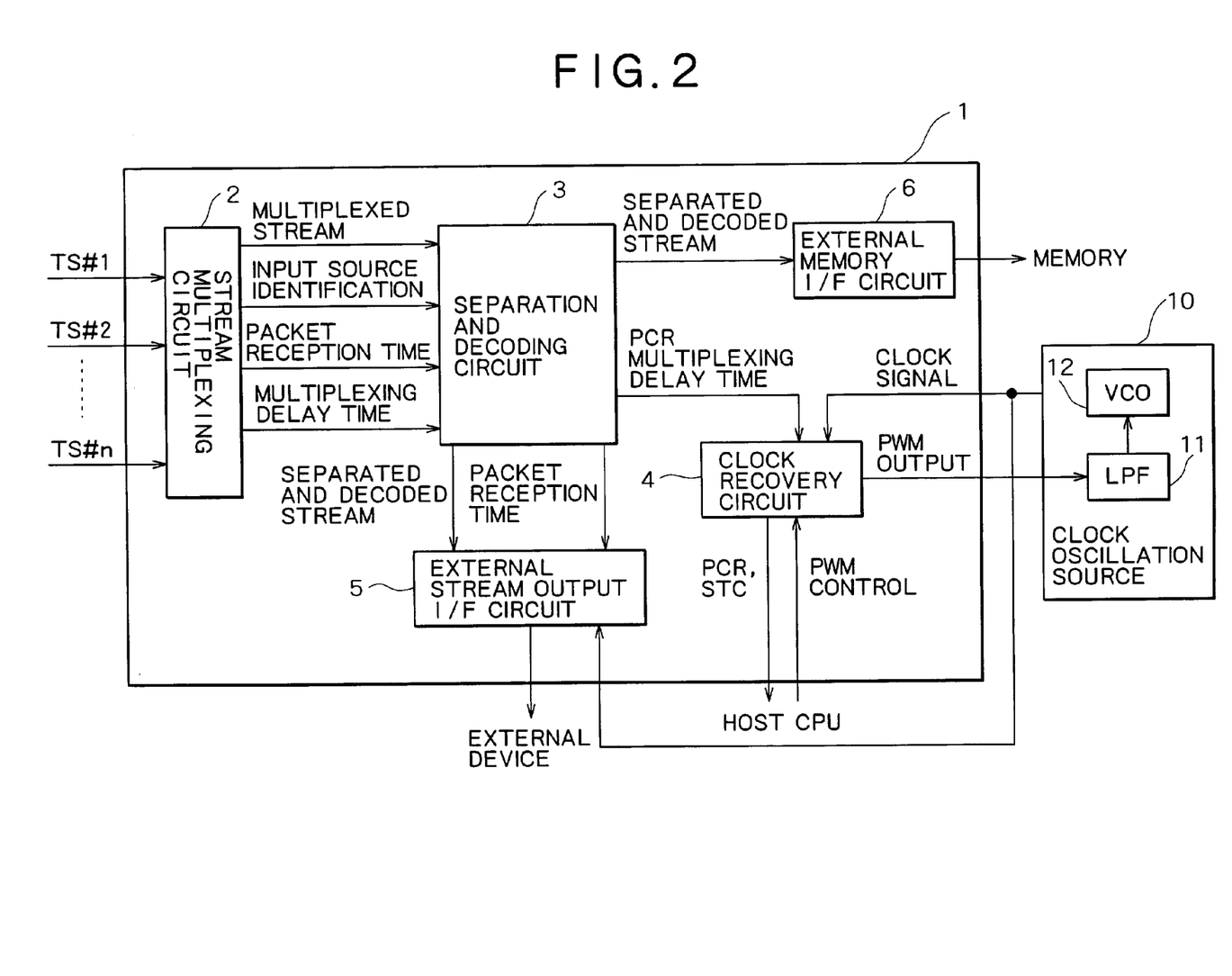
FIG. 2 is a block diagram showing a data separation and decoding device according to an embodiment of the present invention.
Figure 4:
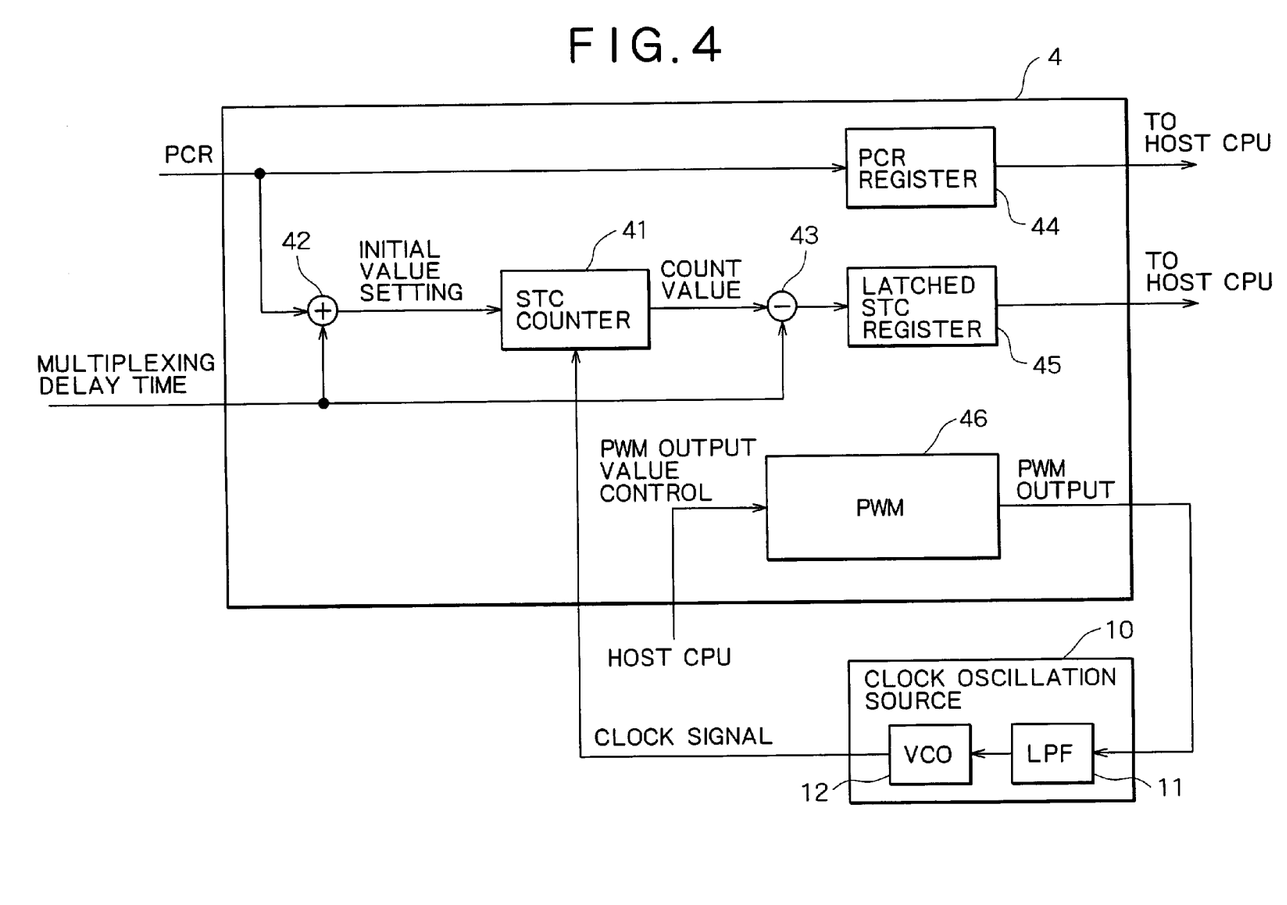
FIG. 4 is a block diagram showing a clock recovery circuit 4 provided in the data separation and decoding device according to the embodiment of the present invention.
Figure 5:
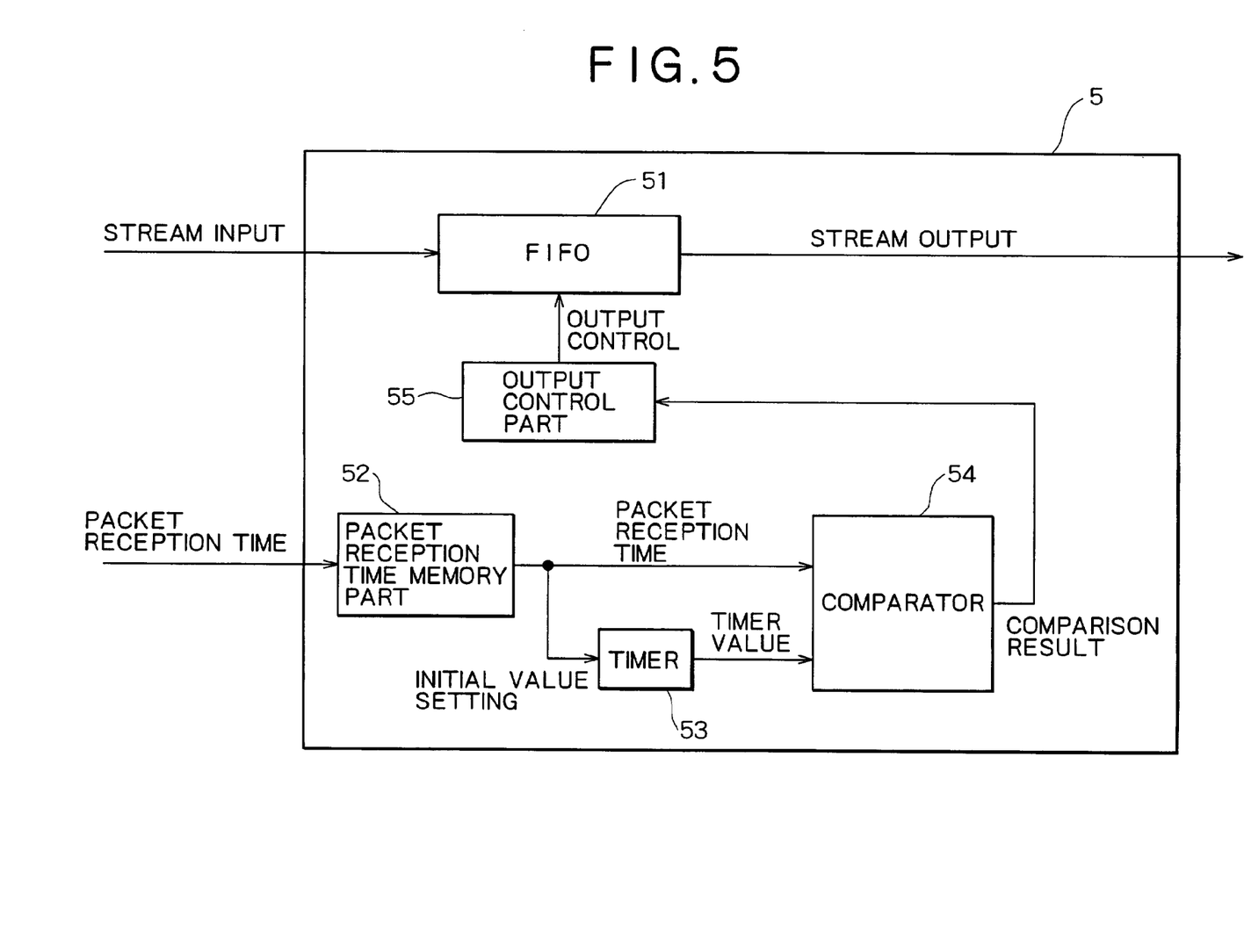
FIG. 5 is a block diagram showing an external stream output I/F circuit 5 provided in the data separation and decoding device according to the embodiment of the present invention.

A data separation and decoding device according to an embodiment of the present invention is concretely described below in reference to the attached drawings. FIG. 2 is a block diagram showing the data separation and decoding device according to the embodiment of the present invention. In addition, FIG. 3 through FIG. 5 are block diagrams showing a stream multiplexing circuit 2, a clock recovery circuit 4 and an external stream output I/F circuit 5, respectively, provided in the data separation and decoding device according to the embodiment of the present invention.

Data separation and decoding device 1 according to the embodiment of the present invention is provided with a stream multiplexing circuit 2 that time division multiplexes transport streams TS#1 to TS#n of n channels in packet units. The number n of channels of transport streams is, for example, three or four, though there is no limitation herein.

Figure 3:
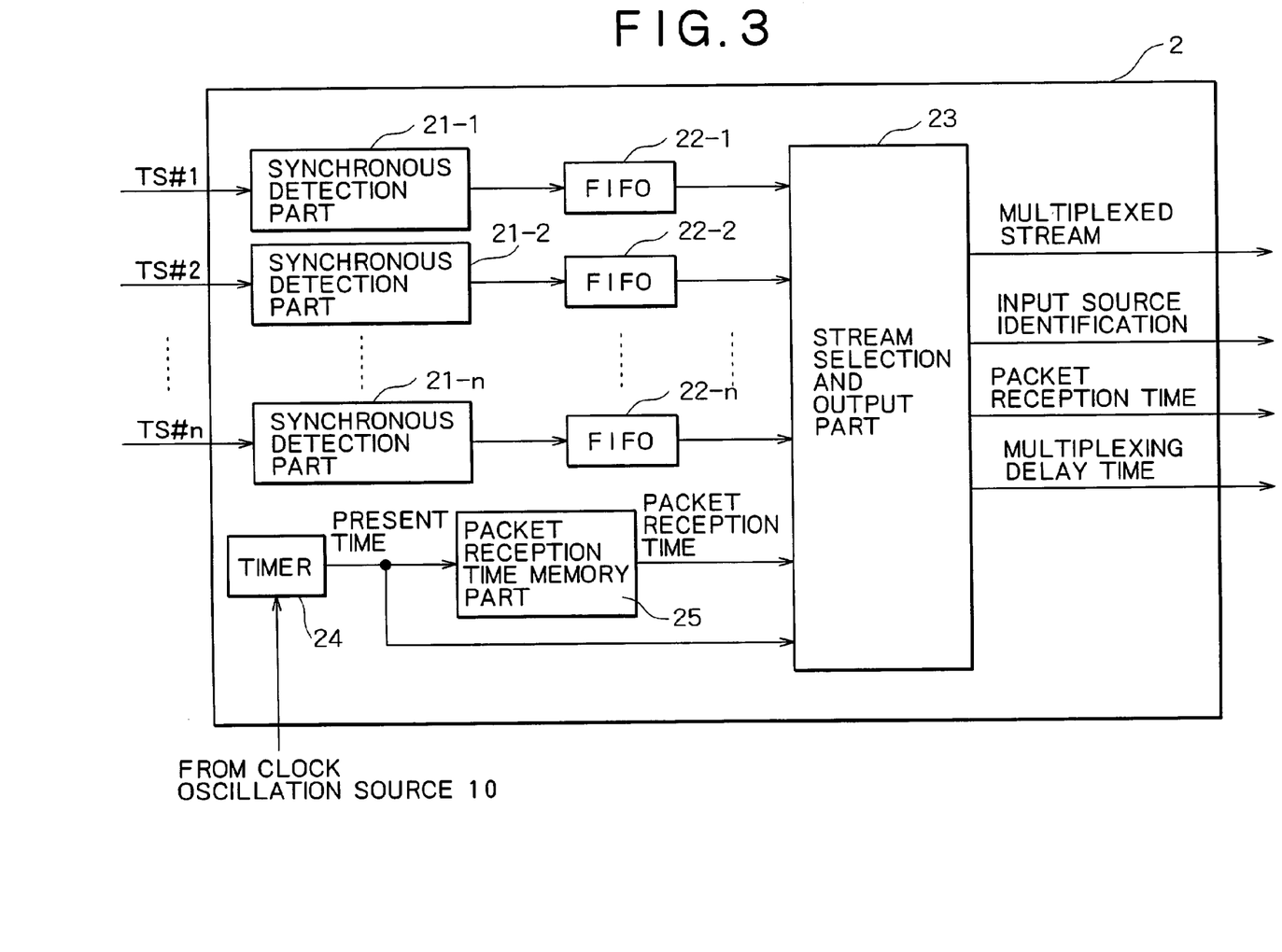
FIG. 3 is a block diagram showing a stream multiplexing circuit 2 provided in the data separation and decoding device according to the embodiment of the present invention.

Stream multiplexing circuit 2 is provided with, as shown in FIG. 3, synchronous determination parts 21-1 to 21-n and with first in/first out memories (FIFO) 22-1 to 22-n, of which the number is the same as the number n of channels of the transport streams. The data transmission speed in each of the transport streams is, for example, 30 Mbps to 50 Mbps. In a case where the signal indicating the front portion of a TS packet is inputted from the outside, together with the stream, synchronous determination parts 21-1 to 21-n detect the front portion of the TS packet using the signal. In addition, in a case where such a signal is not inputted from the outside, the front portion of a TS packet is detected by detecting a synchronous byte (0×47 (h)) that exists for every 188 bytes, which is the packet length of a TS packet. In the case of the latter detection method, when three sequential synchronous bytes (0×47 (h)), for example, exist for every 188 bytes, they are authorized as synchronous bytes. The capacity of each of FIFOs 22-1 to 22-n is at least equal to that of (n/2+1) packets, that is to say, 188×(n/2+1) bytes. Then, synchronous detection parts 21-1 to 21-n output the TS packets, of which the front portions can be detected, to FIFOs 22-1 to 22-n, respectively, while the units of data of which the front portions cannot be detected are discarded.

In addition, stream multiplexing circuit 2 is provided with a timer 24 that synchronizes with the clock signal outputted from clock oscillation source 10, which is provided outside, a packet reception time memory part 25 that stores the output value of timer 24 at the moment when the final byte of each TS packet is inputted to any of FIFOs 22-1 to 22-n as the present time and a stream selection and output part 23 that prepares a multiplexed stream from the output signals of FIFOs 22-1 to 22-n.

Stream selection and output part 23 repeatedly carries out the operation of outputting one TS packet whenever the data of this TS packet is stored in any of FIFOs 22-1 to 22-n and, thereby, prepares one multiplexed stream. In addition, the output speed thereof is greater than the value gained by multiplying the transmission speed of each of the transport streams by the number n of channels and may be, for example, 180 Mbps. In a case where the data of one, or more, TS packets is stored in a plurality of FIFOs, output of the data is carried out starting from the FIFO in which the greatest amount of data is stored. As described above, the capacity of FIFOs 22-1 to 22-n is at least equal to (n/2+1) packets and, therefore, data does not overflow, as described below.

That is to say, the output speed of stream selection and output part 23 is greater than the value gained by multiplying the transmission speed of each of the transport streams by the number n of channels, as described above, and, therefore, when the stream output from stream multiplexing circuit 2, that is to say, the stream output from stream selection and output part 23, is started, the total amount of data stored in each FIFO does not subsequently increase. In addition, during the period from the time when the stream input to stream multiplexing circuit 2 is started to the time when the total amount of data stored in each FIFO reaches n packets (188×n bytes), the amount of stored data reaches, without fail, one TS packet in any of the channels and, therefore, the stream output from stream selection and output part 23 is started. Due to the above, the total amount of data stored in each FIFO cannot exceed n packets. Accordingly, in a case where a FIFO wherein data of n/2 TS packets, or greater, exists, the amount of data stored in this FIFO is greater than the amount of data stored in any other FIFO. On the other hand, even in a case where the amount of data stored in a specific FIFO is slightly less than n/2 TS packets so that data output from another FIFO is carried out, the amount of data stored in this specific FIFO becomes n/2 TS packets, or greater, at the time of selection of the next FIFO and, therefore, the data is outputted from this specific FIFO. Thus, data stored in a FIFO does not overflow.

In addition, stream selection and output part 23 outputs an input source identification signal for each TS packet in order to identify the input source (channel) thereof as well as the time stored in packet reception time memory part 25, that is to say, outputs a packet reception time signal indicating the packet reception time when the final byte of the TS packet is inputted to a FIFO as well as a multiplexing delay time signal indicating the delay time that has occurred due to multiplexing. The multiplexing delay time is the difference between the packet reception time and the time indicated by timer 24 at the point in time when the output of the packet is started. That is to say, the multiplexing delay time in a case where the output of a packet is started according to the clock immediately after the final byte of this packet has been inputted to a FIFO becomes a period of time of one clock.

Data separation and decoding device 1 is provided with a separation and decoding circuit 3 that carries out separation (filtering) of a predetermined TS packet from the multiplexed stream and decoding (descrambling) of the encrypted data based on the input source identification signal outputted from stream multiplexing circuit 2 and on the packet ID of the TS packet in the multiplexed stream so as to extract the desired data. Separation and decoding circuit 3 outputs the packet reception time signal and the multiplexing delay time signal that have been outputted from stream multiplexing circuit 2 together with a separated and decoded stream, which is a stream of the extracted data, as well as a PCR concerning the TS packet that forms the separated and decoded stream from among the PCRs included in some TS packets.

Moreover, data separation and decoding device 1 is provided with a clock recovery circuit 4 to which a PCR and a multiplexing delay time signal are inputted, with an external stream output I/F circuit 5 to which a separated and decoded stream as well as a packet reception time signal are inputted and with an external memory I/F circuit 6 to which a separated and decoded stream is inputted.

External memory I/F circuit 6 is an I/F circuit for a memory.

Clock recovery circuit 4 is provided with, as shown in FIG. 4, an STC counter 41, an adder 42 for setting the initial value of STC counter 41 by adding the value of a PCR to the multiplexing delay time, a subtracter 43 for subtracting the multiplexing delay time from the output (counter value) of STC counter 41, a latched STC register 45 for latching the subtraction result of subtracter 43, a PCR register 44 for latching the value of a PCR and a PWM 46 for controlling the frequency of external clock oscillation source 10, which supplies a clock signal to STC counter 41. Clock oscillation source 10 is provided with an LPF 11 to which the output of PWM 46 is inputted and a VCO 12 wherein the clock signal outputted from VCO 12 is supplied to STC counter 41 and to a timer 24 within stream multiplexing circuit 2. The frequency of this clock signal is, for example, approximately 27 MHz. The clock signal outputted from clock oscillation source 10 is a reference clock signal of the MPEG2 system, as in the above described reference example, and reproduction of images and sounds are carried out according to the MPEG2 system based on this clock signal.

The output value (PCR value) of PCR register 4 and the output value (LSTC value) of latched STC register 5 are compared by, for example, a host CPU and the operation of PWM 46 is controlled based on the comparison result thereof. In a case where the LSTC value is ahead of the PCR value, for example, the host CPU judges that the frequency of the clock signal from clock oscillation source 10 is too high and lowers the output voltage of PWM 46 in order to lower the frequency. On the other hand, in a case where the LSTC value is behind the PCR value, the host CPU judges that the frequency of the clock signal from clock oscillation source 10 is too low and raises the output voltage of PWM 46 in order to raise the frequency.

Here, the setting of the initial value (initialization) of STC counter 41 is carried out according to instruction from the host CPU, or through conditional retrieval in separation and decoding circuit 3, immediately after the start of reception of transport streams and is carried out in a case where the PCR value in the stream becomes discontinuous. In this initialization, adder 42 adds the PCR value extracted from the multiplexed stream to the multiplexing delay time so as to set the sum as the initial value of STC counter 41. After the initialization, PCR register 44 latches the value of a PCR (PCR value) whenever separation and decoding circuit 3 extracts the PCR and, at the same time, latched STC register 45 latches the value (LSTC value) gained by subtracting the multiplexing delay time of the TS packet from the counter value of STC counter 41 by means of subtracter 43 before initialization is again required. Then, as described above, the PCR value and the LSTC value are compared by the host CPU.

External stream output I/F circuit 5 is provided with, as shown in FIG. 5, a FIFO 51 to which a separated and decoded stream outputted from separation and decoding circuit 3 is inputted, with a packet reception time memory part 52 to which a packet reception time signal outputted from separation and decoding circuit 3 is inputted, with a timer 53, with a comparator 54 for comparing a packet reception time with an output from the timer (timer value) and with an output control part 55 for controlling the operation of FIFO 51 based on the comparison result of comparator 54.

The maximum delay in stream multiplexing circuit 2 equals n/2 TS packets and, therefore, the output of a stream is not carried out in this external stream output I/F circuit 5 from the time when the input of the separated and decoded stream is started to the time when data of n/2 TS packets is stored in FIFO 51 and, then, the output of the stream is started at the point in time when data of n/2 TS packets is stored and, at the same time, the packet reception time of the TS packet that has been inputted first is set at timer 53 as the initial value. As for subsequent TS packets, the packet reception time of these TS packets and the output value of timer 53 are compared by comparator 54 so that the output value of timer 53 is outputted from FIFO 51 based on control by means of output control part 55 when the packet reception time of these TS packets is exceeded.

Next, the operation of data separation and decoding device 1 formed as above is described.

When transport streams TS#1 to TS#n of a plurality of channels are transmitted to data separation and decoding device 1, stream multiplexing circuit 2 prepares and outputs a multiplexed stream and, at the same time, generates and outputs an input identification signal, a packet reception time signal and a multiplexing delay time signal for each TS packet. At the time of generation of the packet reception time signal and the multiplexing delay time signal, timer 24 operates by synchronizing the clock signal supplied from clock oscillation source 10.

Next, separation and decoding circuit 3 carries out separation of a predetermined TS packet from the multiplexed stream and decoding of the encrypted data based on the input source identification signal and on the packet ID so as to extract the desired data. In addition, separation and decoding circuit 3 extracts PCRs included in some TS packets in the multiplexed stream. Separation and decoding circuit 3 outputs the separated and decoded stream, which is a stream of the extracted data, to external stream output I/F circuit 5 and to external memory I/F circuit 6, outputs without change the packet reception time signal outputted from stream multiplexing circuit 2 to external stream output I/F circuit 5 and outputs the multiplexing delay time signal and the PCR outputted from stream multiplexing circuit 2 to clock recovery circuit 4.

Clock recovery circuit 4 carries out the setting of the initial value of STC counter 41 based on the instruction of the host CPU or based on the result of conditional retrieval in separation and decoding circuit 3 immediately after the reception of transport streams and in a case where the PCR value in the stream becomes discontinuous. Concretely, adder 42 adds the PCR value extracted from the multiplexed stream to the multiplexing delay time so as to set the sum as the initial value of STC counter 41. Thereafter, PCR register 44 latches the value (PCR value) whenever separation and decoding circuit 3 extracts a PCR before initialization is again required. In addition, at the same time as the above, latched STC register 45 latches the value (LSTC value) gained by subtracting the multiplexing delay time of the TS packet from the counter value of STC counter 41 by means of subtracter 43. Then, an external host CPU compares the PCR value and the LSTC value.

As a result of this comparison, in a case where the LSTC value is ahead of the PCR value, the host CPU judges that the frequency of the clock signal from clock oscillation source 10 is too high and lowers the output voltage of PWM 46. When the output voltage of PWM 46 is lowered, the oscillation frequency of VCO 12 is also lowered and, therefore, the counting speed of STC counter 41 decreases and the speed of progress of the LSTC value decreases so that the LSTC value approaches the PCR value.

On the other hand, in a case where the LSTC value is behind the PCR value, the host CPU judges that the frequency of the clock signal from clock oscillation source 10 is too low and raises the output voltage of PWM 46. When the output voltage of PWM 46 is raised, the oscillation frequency of VCO 12 is also raised and, therefore, the counting speed of STC counter 41 increases and the speed of progress of the LSTC value increases so that the LSTC value approaches the PCR value.

Accordingly, in either case, the frequency of the clock signal supplied from clock oscillation source 10 is appropriately adjusted so that the counting speed of STC counter 41 is optimized.

In addition, in external stream output I/F circuit 5 the output of the stream is started at the point in time when the data of n/2 TS packets is stored in FIFO 51 after the input of the separated and decoded stream is started and, at the same time, the packet reception time of the TS packet that has first been inputted is set at timer 53 as the initial value. Then, as for the subsequent TS packets, comparator 54 compares the packet reception time of these TS packets and the output value of timer 53 so that output control part 55 outputs these TS packets to FIFO 51 based on the output signal of comparator 54 when the output value of timer 53 exceeds the packet reception time of these TS packets. Accordingly, the time intervals of two TS packets that are sequential in the separated and decoded stream outputted from external stream output I/F circuit 5 to an external device, such as another STB, agree with the time intervals of the TS packets at the time when they are received by stream multiplexing circuit 2. Therefore, it is also possible to easily recover the clock signal in the external device.

Here, external memory I/F circuit 66 outputs the separated and decoded stream inputted from separation and decoding circuit 3 to an external memory.

In the following, the effects according to adjustment of the frequency of the clock signal in the above described embodiment are described in comparison with the reference example. In this description, the PCR is provided in all of the TS packets and, furthermore, the frequency of the clock signal on the transmission side and the frequency of the clock signal outputted from the clock oscillation source on the reception device side, such as an STB, always agree with each other. Accordingly, as long as the device correctly operates, the PCR value and the LSTC value agree with each other.

In a case where a multiplexing delay does not exist, that is to say, in a case where the received TS packet can be outputted without change, the relationship shown in Table 1 is achieved while in a case where the configuration of the reference example is adopted, the relationship shown in Table 2 is achieved, and in the case of the above described embodiment, the relationship shown in Table 3 is achieved.

In the following Tables 1 through 3, "PCR" indicates the value of PCR included in each TS packet, "t" indicates the arrival time of a TS packet at the clock recovery circuit, "s" indicates the counter value of the STC counter within the clock recovery circuit and "LSTC" indicates the value latched by the latched STC register within the clock recovery circuit. Here, the value latched by the PCR register within the clock recovery circuit equals the "PCR." In addition, "$d_n$" indicates the multiplexing delay time of TS packet number n.

TABLE 1

| Packet No. | 0 | 1 | 2 | 3 |
|---|---|---|---|---|
| PCR | PCR = $p_0$ | PCR = $p_1$ | PCR = $p_2$ | PCR = $p_3$ |
| T | $t_0 = p_0$ | $t_1 = p_1$ | $t_2 = p_2$ | $T_3 = p_3$ |
| S | $s_0 = p_0$ | $s_1 = s_0 + (t_1 - t_0) = p_1$ | $s_2 = s_1 + (t_2 - t_1) = p_2$ | $s_3 = s_2 + (t_3 - t_2) = p_3$ |
| LSTC | LSTP = $s_0$ = $p_0$ | LSTP = $s_1$ = $p_1$ | LSTP = $s_2$ = $p_2$ | LSTP = $s_3$ = $p_3$ |

TABLE 2

| Packet No. | 0 | 1 | 2 | 3 |
|---|---|---|---|---|
| PCR | PCR = $p_0$ | PCR = $p_1$ | PCR = $p_2$ | PCR = $p_3$ |
| T | $t_0 = p_0 + d_0$ | $t_1 = p_1 + d_1$ | $t_2 = p_2 + d_2$ | $t_3 = p_3 + d_3$ |
| S | $s_0 = p_0$ | $s_1 = s_0 + (t_1 - t_0) = p_1 + d_1 - d_0$ | $s_2 = s_1 + (t_2 - t_1) = p_2 + d_2 - d_0$ | $s_3 = s_2 + (t_3 - t_2) = p_3 + d_3 - d_0$ |
| LSTC | LSTP = $s_0$ = $p_0$ | LSTP = $s_1$ = $p_1 + d_1 - d_0$ | LSTP = $s_2$ = $p_2 + d_2 - d_0$ | LSTP = $s_3$ = $p_3 + d_3 - d_0$ |

TABLE 3

| Packet No. | 0 | 1 | 2 | 3 |
|---|---|---|---|---|
| PCR | PCR = $p_0$ | PCR = $p_1$ | PCR = $p_2$ | PCR = $p_3$ |
| T | $t_0 = p_0 + d_0$ | $t_1 = p_1 + d_1$ | $t_2 = p_2 + d_2$ | $t_3 = p_3 + d_3$ |
| S | $s_0 = p_0 + d_0$ | $s_1 = s_0 + (t_1 - t_0) = p_1 + d_1$ | $s_2 = s_1 + (t_2 - t_1) = p_2 + d_2$ | $s_3 = s_2 + (t_3 - t_2) = p_3 + d_3$ |
| LSTC |  | LSTP = $s_1 - d_1 = p_1$ | LSTP = $s_2 - d_2 = p_2$ | LSPT = $s_3 - d_3 = p_3$ |

As shown in Table 1, in a case where multiplexing delay time does not exist, the arrival time of a TS packet at the clock recovery circuit agrees with the PCR value. Accordingly, even after the initial value of the STC counter is set as "$s_0 = p_0$," the PCR value latched by the PCR register and the LSTC value latched by the latched STC register always agree with each other.

On the other hand, in the case of the reference example, multiplexing delay time differs for every TS packet and, therefore, the time shift between the arrival time at the clock recovery circuit and the PCR value differs for every TS packet. Then, no processing is carried out in reference to this difference and, therefore, the time shift between the STC counter value and the PCR value also differs for every TS packet. For example, it becomes "$d_1 - d_0$" in packet number 1, "$d_2 - d_0$" in packet number 2 and "$d_3 - d_0$" in packet number 3. As a result of this, the frequency of the clock signal on the reception side is modified unnecessarily even though the frequency of the clock signal on the oscillation side and the frequency of the clock signal on the reception side agree with each other and, therefore, a shift occurs between these frequencies so that an appropriate reproduction, or the like, cannot be carried out.

Then, in the case of the above described embodiment of the present invention, the multiplexing delay time also differs for every TS packet and, therefore, the shift between the arrival time at the clock recovery circuit and the PCR value differs for every TS packet. In the embodiment, however, the multiplexing delay time in packet number 0 is included in the STC counter value by means of adder 42 at the time of initial value setting and, therefore, the STC counter values of subsequent packets agree with the arrival times at the clock recovery circuit. The arrival times at the clock recovery circuit are the sums of the PCR values of these packets and the multiplexing delay times of these packets and, therefore, the multiplexing delay times are subtracted by subtracter 43 so that the LSTC values agree with the PCR values. According to the present embodiment, the LSTC values agree with PCR values even though the multiplexing delay time differs for every TS packet in the above described manner and, therefore, it is possible to prevent the mismatch (jitter) of the clock signal that occurs in the reference example and to prevent disturbance of the accompanying reproduction, or the like.

Here, in a case where a plurality of programs is displayed on the screen of a display device, wherein a double split screen or a quadruple split screen is displayed, for example, it is necessary to provide clock recovery circuits in the same number as the screens. In addition, a multiplexing delay time signal is required for every clock recovery circuit and, therefore, the same number of timers within the stream multiplexing circuits is, accordingly, required.

In addition, in a case where the separated and decoded stream is outputted simultaneously to a plurality of external devices, a plurality of external stream output I/F circuits 5 may be provided.

As is described above in detail according to the present invention, a plurality of transport streams is multiplexed before processing is carried out by separation and decoding circuits and, therefore, the number of separation and decoding circuits can be made smaller than the number of transport streams. Accordingly, the scale of the entire device can be reduced. In addition, the clock recovery circuit allows the frequency of the clock signal to be adjusted so as to be associated with the multiplexing delay time of a packet (claims 1 and 3) and, therefore, there is no effect caused by the difference in the delay time of each packet. Accordingly, the entire system can be operated by an appropriate clock signal. Moreover, an output interface circuit is provided (claims 2 and 3) and, thereby, the time information in a stream outputted to another device can be made to agree with the time information on the oscillation side, such as from a broadcast station. Accordingly, an appropriate reproduction can also be carried out in a device connected to the rear stage.

What is claimed is:

1. A data separation and decoding device for extracting desired data from a plurality of transport streams formed of a plurality of sequential packets, some of which include transmission time information, comprising:
   a stream multiplexing circuit for multiplexing said plurality of transport streams and for outputting a multiplexing delay time signal indicating delay time of each packet that has occurred at the time of said multiplexing;
   a separation and decoding circuit for receiving the multiplexing delay time signal from the stream multiplexing circuit, and for arbitrarily selecting data from the stream multiplexed by said stream multiplexing circuit and for preparing a separated and decoded stream by decrypting the data in a case where the data has been encrypted or by forming the separated and decoded stream of a packet in the original form in a case where the data has not been encrypted as well as for outputting said multiplexing delay time signal and said transmission time information included in said multiplexed stream; and
   a clock recovery circuit for allowing a clock oscillation source to adjust the frequency of a clock signal from the clock oscillation source whenever said transmission time information from said plurality of sequential packets is inputted to the stream multiplexing circuit so that the frequency is associated with the transmission time information and the delay time of the packet.

2. A data separation and decoding device for extracting desired data from a plurality of transport streams formed of a plurality of sequential packets, some of which include transmission time information, comprising:
   a stream multiplexing circuit for multiplexing said plurality of transport streams and for outputting a reception time signal indicating the reception time of each packet;
   a separation and decoding circuit for receiving the reception time signal from said stream multiplexing circuit and for arbitrarily selecting data from the stream multiplexed by said stream multiplexing circuit and for preparing a separated and decoded stream by decrypting the data in a case where the data has been encrypted or by forming the separated and decoded stream of a packet in the original form in a case where the data has not been encrypted as well as for outputting said reception time signal; and
   an output interface circuit for outputting a packet forming said separated and decoded stream that matches the reception time indicated by said reception time signal.

3. A data separation and decoding device for extracting desired data from a plurality of transport streams formed of a plurality of sequential packets, some of which include transmission time information, comprising:
   a stream multiplexing circuit for multiplexing said plurality of transport streams and for outputting a multiplexing delay time signal indicating delay time of each packet that has occurred at the time of said multiplexing and a reception time signal indicating the reception time of each packet;

a separation and decoding circuit for receiving the multiplexing delay time signal from the stream multiplexing circuit, and for arbitrarily selecting data from the stream multiplexed by said stream multiplexing circuit and for preparing a separated and decoded stream by decrypting the data in a case where the data has been encrypted or by forming the separated and decoded stream of a packet in the original form in a case where the data has not been encrypted as well as for outputting said multiplexing delay time signal, said reception time signal and said transmission time information included in said multiplexed stream;

a clock recovery circuit for allowing a clock oscillation source to adjust the frequency of a clock signal from the clock oscillation source whenever said transmission time information from said plurality of sequential packets is inputted from the stream multiplexing circuit so that the frequency is associated with the transmission time information and the delay time of the packet; and an output interface circuit for outputting a packet forming said separated and decoded stream that matches the reception time indicated by said reception time signal.

4. The data separation and decoding device according to claim 1, wherein said stream multiplexing circuit has a first in/first out memory provided for each of said transport streams, and said delay time is the period of time from the time when the final byte of each packet is inputted to said first in/first out memory to the time when the front byte of the packet is outputted.

5. The data separation and decoding device according to claim 3, wherein said stream multiplexing circuit has a first in/first out memory provided for each of said transport streams, and said delay time is the period of time from the time when the final byte of each packet is inputted to said first in/first out memory to the time when the front byte of the packet is outputted.

6. The data separation and decoding device according to claim 1, wherein said clock recovery circuit has a first register for latching said transmission time information; a counter; an adder for setting the value gained by adding said delay time to the transmission time indicated by said transmission time information as the initial value of said counter; a subtracter for subtracting said delay time of each packet from the output value of said counter; and a second register for latching the output value of said subtracter, wherein adjustment of said clock oscillation source is carried out in accordance with the difference between the output values of said first and second registers.

7. The data separation and decoding device according to claim 3, wherein said clock recovery circuit has a first register for latching said transmission time information; a counter; an adder for setting the value gained by adding said delay time to the transmission time indicated by said transmission time information as the initial value of said counter; a subtracter for subtracting said delay time of each packet from the output value of said counter; and a second register for latching the output value of said subtracter, wherein adjustment of said clock oscillation source is carried out in accordance with the difference between the output values of said first and second registers.

8. The data separation and decoding device according to claim 2, wherein said output interface circuit outputs each packet associated with the difference between the two reception times of the sequential packets included in said separated and decoded stream.

9. The data separation and decoding device according to claim 3, wherein said output interface circuit outputs each packet associated with the difference between the two reception times of the sequential packets included in said separated and decoded stream.

10. The data separation and decoding device according to claim 6, wherein said clock recovery circuit has a control unit for controlling the operation of said clock oscillation source so that the difference between the output values of said first and second registers is nullified.

11. The data separation and decoding device according to claim 7, wherein said clock recovery circuit has a control unit for controlling the operation of said clock oscillation source so that the difference between the output values of said first and second registers is nullified.

12. The data separation and decoding device according to claim 8, wherein said clock recovery circuit has a control unit for controlling the operation of said clock oscillation source so that the difference between the output values of said first and second registers is nullified.

13. The data separation and decoding device according to claim 9, wherein said clock recovery circuit has a control unit for controlling the operation of said clock oscillation source so that the difference between the output values of said first and second registers is nullified.

14. The data separation and decoding device according to claim 10, wherein said control unit is a pulse width modulator.

15. The data separation and decoding device according to claim 11, wherein said control unit is a pulse width modulator.

16. The data separation and decoding device according to claim 12, wherein said control unit is a pulse width modulator.

17. The data separation and decoding device according to claim 13, wherein said control unit is a pulse width modulator.

* * * * *